United States Patent [19]

McLatchy et al.

[11] Patent Number: 5,673,038
[45] Date of Patent: Sep. 30, 1997

[54] PROCESS VARIABLE MEASURING AND DISPLAY DEVICE AND PORTABLE POWER SUPPLY

[75] Inventors: Richard Colgate McLatchy; Jon Douglas de Silva, both of Houston, Tex.

[73] Assignee: Houston Digital Instruments, Inc., Houston, Tex.

[21] Appl. No.: 89,669

[22] Filed: Jul. 9, 1993

Related U.S. Application Data

[63] Continuation-in-part of Ser. No. 765,432, Sep. 25, 1991, abandoned.
[51] Int. Cl.⁶ ................................................. G08C 19/16
[52] U.S. Cl. ........................ 340/870.21; 340/870.39; 345/35; 345/211
[58] Field of Search .................... 340/870.21, 870.39; 345/4, 35, 40, 87, 140, 205, 211, 212; 327/530, 533, 538

[56] References Cited

U.S. PATENT DOCUMENTS

| | | | |
|---|---|---|---|
| 3,835,465 | 9/1974 | Tannas, Jr. et al. | 345/40 |
| 4,745,543 | 5/1988 | Michener et al. | 345/40 |
| 5,049,864 | 9/1991 | Barshinger | 345/35 |

*Primary Examiner*—John K. Peng
*Assistant Examiner*—Andrew Hill
*Attorney, Agent, or Firm*—Rosenblatt & Redano, P.C.

[57] ABSTRACT

This invention relates to the field of process variable measuring and display devices and portable power supplies for process variable display devices. This invention can be used to measure and display any process variable, including pressure, temperature, volume, and flow rate. Specifically, this invention relates to an electronic process variable measuring device electronically coupled to a battery powered process variable display device which displays both a bar graph trend indication of the process variable and a digital display of the process variable. In a preferred embodiment, the process variable display device is totally self-contained, including the battery operated power supply.

20 Claims, 5 Drawing Sheets

PROCESS VARIABLE MEASURING AND DISPLAY DEVICE AND PORTABLE POWER SUPPLY

RELATED APPLICATIONS

This application is a continuation-in-part of application Ser. No. 07/765,432, filed on Sep. 25, 1991, abandoned.

BACKGROUND OF THE INVENTION

1. Field of the Invention

This invention relates to the field of process variable measuring and display devices and portable power supplies for process variable display devices. This invention can be used to measure and display a process variable or indicia, including pressure, temperature, volume, and flow rate. Specifically, this invention relates to an electronic process variable measuring device electronically coupled to a battery powered process variable display device which displays both a bar graph trend indication of the process variable and a digital display of the process variable.

2. Description of the Prior Art

The measurement of process variables or parameters, including but not limited to flow, volume, temperature, and pressure, has long been important in industrial facilities where fluid is stored, pumped, heated, and/or pressurized. Such industries include petrochemical, power generation, geophysical exploration and production, and food processing.

In many industrial applications, it is desirable to display the measured process variable at a location remote from where the process variable is measured. Accordingly, process instrumentation has evolved into process measuring and display devices wherein the display device is remotely located from the measuring device. In many applications, adverse environmental conditions necessitate having a process display device remotely located from the process measuring device.

Early process instrumentation was mechanical in nature. Examples of mechanical process instrumentation included floats for measuring level, pitot tubes to measure flow rate, and hydraulic devices for measuring pressure. Such mechanical devices have limited accuracy and are subject to phenomena such as hysteresis and temperature effects, which further limits their dependability.

Another drawback of mechanical process variable measuring devices is the limitation upon how remotely they can be located from a transducer. For instance, in the case of a bourdon tube for measuring pressure, the internal volume of fluid in the bourdon tube places a practical limit upon the distance between the bourdon tube and its associated transducer. Safety concerns may also limit the degree to which mechanical process variable measuring devices such as bourdon tubes may be separated from process variable display devices. In many applications, the process variable measuring device and the process variable display device are connected by pressurized lines or hoses. Such pressurized lines or hoses present safety hazards in certain instances.

Environmental transients, such as changes in temperature, can also affect the accuracy of instrument readings wherein a pressurized line or hose of hydraulic fluid connects the process variable instrument to the transducer.

Prior art process variable display devices have appeared in the form of gauges wherein an analog reading is given by a needle, such as by a D'arsonval movement. Such needle gauge displays tend to give an unsteady or erratic reading, particularly during the measurement of dynamic processes such as discharge pressure at the outlet of a positive displacement pump. The reading on such needle gauges is also affected by other dynamic phenomena such as hysteresis and are generally slow in response due to the inertia of the movement itself.

With the advent of liquid crystal display (LCD) technology, the needle gauge has been replaced in some applications with a multi-segment bar graph, each segment comprised of a liquid crystal element. Such LCD analog displays, when coupled with mechanical process variable measuring devices, are subject to many of the same inaccuracies and limitations as needle gauges. The resolution of multi-segment bar graph displays using LCD technology is a function of the number of LCD segments in the display for a given process variable range. The greater the number of segments in the multi-segment display, the greater the resolution of the display. Prior art multi-segment bar graphs have utilized multiplexing in order to minimize the number of electrical connections that must be input into the multi-segment bar graph display. Although multiplexing reduces the number of electrical connections, it also reduces voltage contrast. For instance, in a triplexed, multiplexed system, the voltage contrast is reduced by a factor of three.

Digital displays have been used with process variable measuring devices to give a more precise indication of the magnitude of the process variable being measured. When coupled with mechanical process variable measuring devices, such digital displays are inaccurate and unstable, particularly during the measurement of dynamic processes.

Digital displays utilizing both LCD and LED technology have become more common in recent years. Electricity is necessary to power such displays. Many prior art instruments using LED's or LCD's have relied upon AC power supplies or house current. Such reliance is often undesirable in environments where house current may be interrupted due to adverse environmental conditions such as lightning strikes, earthquakes, or tornados. This is particularly undesirable on offshore drilling and production platforms where lightning strikes and other inclement weather conditions are common.

In many applications, it is highly desirable that process variable display devices be visible with the human eye in less than optimal light conditions or from distances in excess of 35 feet. The visibility of multi-digit LCD displays is enhanced by increasing the size of the digits and by increasing the color contrast of the LCD display. In order to increase both the size and color contrast of LCD digits, the voltage contrast input into the multi-digit LCD must be increased.

The magnitude of voltage contrast needed to power LCD digits that would be visible by the human eye from a distance of over 35 feet is greater than the voltage contrast produced in multiplexed systems. Thus, prior art process variable display devices have failed to combine both multi-segment bar graphs and multi-digit LCD's visible by the human eye from a distance of over 35 feet, because the voltage contrast requirements of each display are different.

SUMMARY OF THE INVENTION

The present invention relates to a process variable measuring and display device with superior accuracy, versatility, dependability, and display capabilities. Superior accuracy is achieved by using an electronic process variable measuring device rather than a mechanical process variable measuring device. The electronic process variable measuring device of the present invention is not subject to the distance, accuracy and sensitivity limitations of hydraulic devices. The electronic process variable measuring device of the present invention does not require pressurized lines or hoses and thus avoids the safety problems inherent with such pressurized lines and hoses.

The electronic process variable measuring device of the present invention is more versatile than mechanical measuring devices such as hydraulic lines. It can be used to measure pressure in high pressure environments, such as the choke manifold on a drilling rig. The electronic process variable measuring device of the present invention is not adversely affected by rapid temperature or pressure changes as are hydraulic process variable measuring devices.

The dependability of the present invention is superior to that of the prior art due to the ability of the present invention to run on battery power rather than AC power or house current. AC power supplies may be interrupted by adverse environmental conditions. The present invention comprises a portable power supply or portable power pack which is sealed in a casing capable of protecting the power supply from adverse environmental conditions such as wind, rain, seawater, and abrasive or corrosive chemicals. The process variable measuring device of the present invention operates on low current, thereby permitting the use of a portable power supply which, in a preferred embodiment, can provide normal operating power for at least 20 months. This power supply offers distinct advantages over prior art power supplies by combining the features of (1) long life, at least 20 months, and (2) intrinsically safe operation, in that it will not produce a spark capable of igniting an explosive mixture.

The superior display capabilities of the process variable display device of the present invention are achieved by using both a multi-segment bar graph display to indicate the trend of the process variable being measured and a multi-digit LCD to provide an accurate reading of the process variable being measured. The stability and accuracy of both displays is superior to that of prior art instruments which rely upon mechanical, rather than electrical, process variable measuring devices. The multi-segment bar graph display and the multi-digit LCD of the present invention are configured such that they can be read with the human eye from a distance of over 35 feet. This superior display capability is achieved by providing high color contrast on both the bar graph and multi-digit LCD displays and by providing large digits on the multi-digit display. Both of these displays are contained within a housing along with the portable power supply.

The present invention overcomes the problem of combining a multiplexed display with a multi-digit LCD requiring a large voltage contrast by utilizing custom designed analog to digital converters (ADC's) for each display.

Specifically, the process variable display device of the present invention comprises a first ADC with digit drive capabilities configured to receive a process variable input signal from a process variable measuring device, a second ADC with bar graph driving capabilities configured to receive a process variable input signal from a process variable measuring device, a multi-digit LCD electronically coupled to receive an input signal from the first ADC, and a multi-segment bar graph electronically coupled to receive an input signal from the second ADC. The first ADC, second ADC, multi-digit LCD, and multi-segment bar graph are operable in combination on a current draw of less than 1.0 milliampere. Thus, each display is separately driven by an ADC that is configured to receive a process variable input signal from a process variable measuring device.

A preferred embodiment of the present invention comprises a portable power supply operatively coupled to supply power to the first and second ADC's, the multi-digit LCD, and the multi-segment bar graph. The portable power supply also provides power to the sensor components, including a Wheatstone bridge. This power supply is capable of supplying power to these components for at least 20 months. The preferred embodiment of the present invention has current and voltage characteristics such that it cannot produce a spark capable of igniting an explosive mixture. These attributes make the present invention intrinsically safe. In a preferred embodiment, the portable power supply provides at least seven volts and 28 ampere hours of current to produce the intrinsically safe operation of the present invention without the need to add physical barriers. Thus, this preferred embodiment of the present invention is superior to all prior art process variable display devices that are dependent upon AC power or house current for reasons previously discussed herein.

In another preferred embodiment, the process variable display device of the present invention is housed in a substantially cylindrical body with a removable display face through which the multi-segment bar graph display and the multi-digit LCD can be read. This cylindrical body is dimensionally configured such that it can easily fit into spaces in commercially available instrument panels where prior art process variable display devices are presently installed. Thus, the process variable display device of the present invention is configured to easily replace prior art process variable display devices without requiring a replacement or modification of existing instrument panels.

The present invention is also directed toward a process variable measuring and display device comprising a process variable measuring device capable of producing an electronic process variable input signal that is proportional to the magnitude of the measured process variable, a direct drive ADC electronically coupled to receive an electronic process variable input signal from the process variable measuring device, a multiplexed ADC electronically coupled to receive an electronic process variable input signal from the process variable measuring device, a multi-digit LCD electronically coupled to receive an input signal from the direct drive ADC, and a multi-segment bar graph display electronically coupled to receive an input signal from the multiplexed ADC.

DESCRIPTION OF THE PREFERRED EMBODIMENTS

Figure 1:
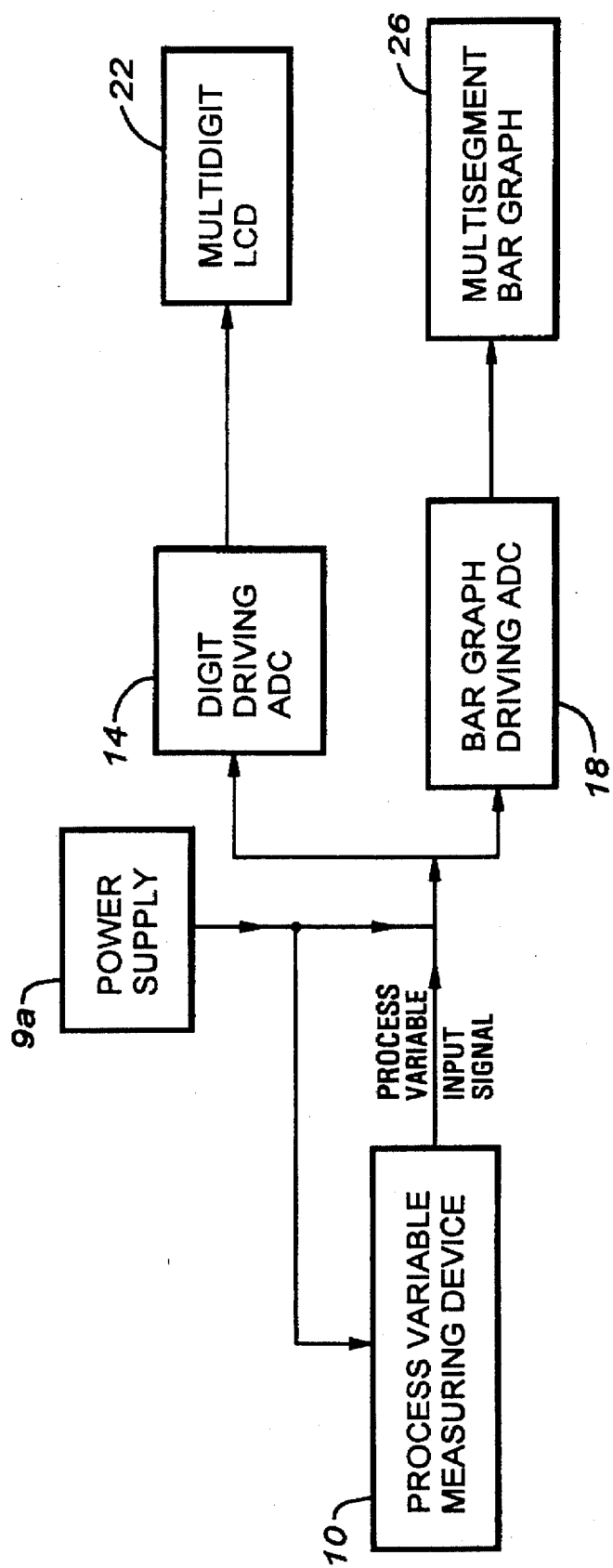
FIG. 1 is a block diagram of several embodiments of the present invention.

As shown in FIG. 1, the process variable measuring device of the present invention comprises a first ADC with digit drive capabilities 14 configured to receive a process variable input signal from a process variable measuring device 10, a second ADC with bar graph drive capabilities 18 configured to receive a process variable input signal from a process variable measuring device 10, a multi-digit LCD 22 electronically coupled to receive an input signal from the first ADC 14, and a multi-segment bar graph 26 electronically coupled to receive an input signal from the second ADC 18.

Figure 2:
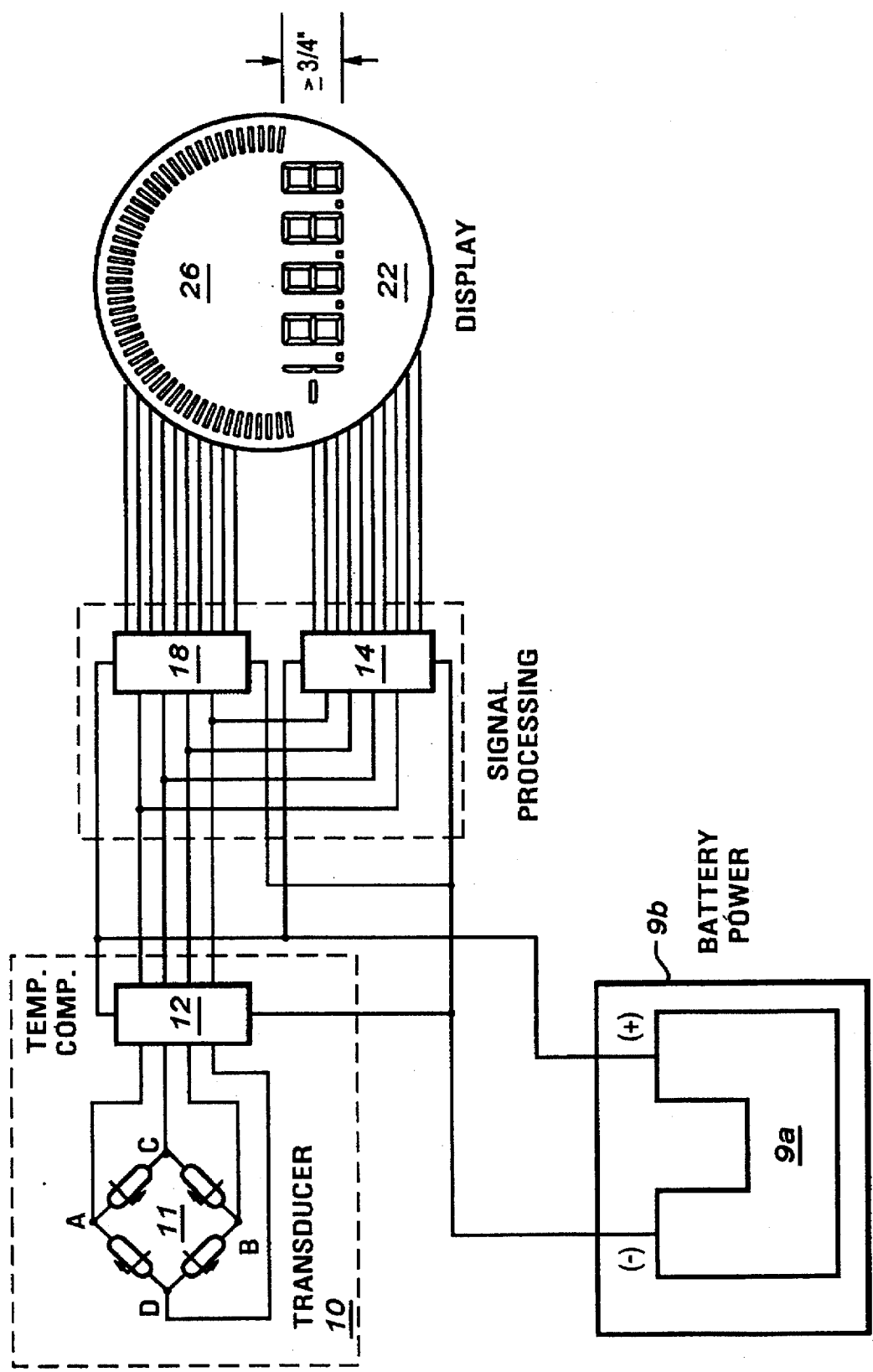
FIG. 2 is a schematic diagram of several embodiments of the present invention depicting a physical embodiment of the multi-segment bar graph display and the multi-digit LCD.

A preferred embodiment of the present process variable display device is depicted in FIG. 2. In a preferred embodiment, the multi-segment bar graph 26 is operable on a supply current of less than 0.5 milliampere. This low supply current characteristic of the multi-segment bar graph 26 contributes to the overall low current draw characteristics of the process variable display device of the present invention.

As shown in FIG. 2, the multi-segment bar graph 26 has at least 62 segments. In the most preferred embodiment, the multi-segment bar graph 26 has 101 segments. As further shown in FIG. 2, the multi-digit LCD 22, comprises at least three digits, each of which are at least ¾" high. This display permits viewing the process variable from at least about 35 feet.

This display provides an additional advantage in that it is viewable from about 30° on either side of an axis perpendicular to the plane of the display. Assume that the face of the display is the face of a clock. If the display is tilted toward the viewer (i.e., viewing from 12 o'clock), the display is viewable up to 15° of tilt. If the display is tilted back away from the viewer, to the left, or to the right, (i.e., viewing from 6, 3, and 9 o'clock respectively), the display is viewable up to 30° of tilt, with the optimum viewing angle at 6 o'clock.

As further shown in FIG. 2, the second ADC 18 is multiplexed. The first ADC 14 is a direct drive ADC, as shown in FIG. 2. In a preferred embodiment, the first and second ADC's are semiconductor chips, manufactured by Harris Semiconductor, having model Nos. ICL7136 and ICL7182, respectively. These semiconductor chips are operable on a supply current of less than 0.5 milliampere, thus facilitating the battery powered operation of the present invention for periods of at least 20 months without replacing the battery pack. The low supply current characteristics of the first ADC and second ADC contribute to the low overall current draw of the processed variable display device. That device is operable on a total current draw of less than 1.0 milliampere. This low current draw characteristic allows the process variable display device to be operably powered by portable power supply 9A for at least 20 months. This is a distinct advantage over prior art devices.

Figure 3C:
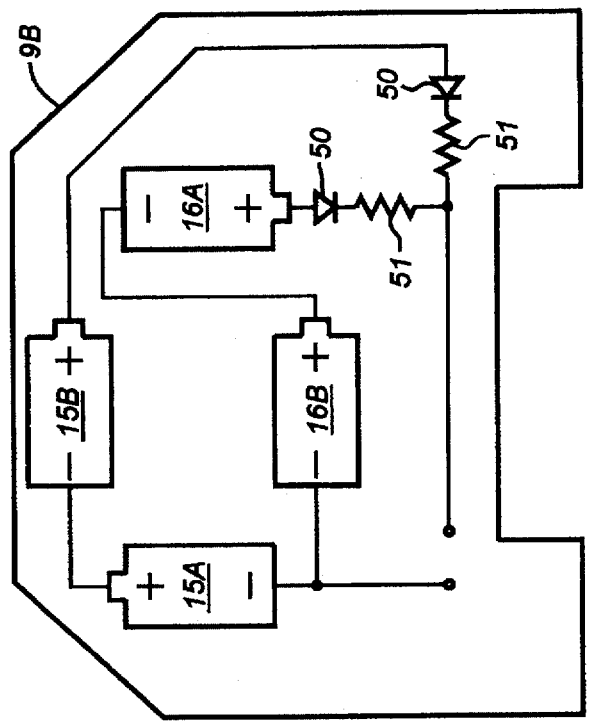
FIG. 3C is a cutaway top view of the portable power pack of the present invention.

In a preferred embodiment, the present invention comprises a portable power supply 9A operatively coupled to supply power to the first ADC 14, the second ADC 18, the multi-digit LCD 22, and the multi-segment bar graph 26. In a preferred embodiment, portable power supply 9A is sealed in a casing 9B capable of protecting it from adverse environmental conditions, as shown in FIG. 3B. As shown in FIG. 3C, the portable power supply 9A comprises a plurality of assemblies comprising individual batteries 15 A–B and 16 A–B enclosed within the casing 9B. The portable power supply 9A housed in casing 9B constitutes a portable power pack. In a preferred embodiment, portable power pack 9B is operatively coupled to supply normal operating power to direct drive ADC 14, multiplexed ADC 18, bar graph display 26, and multi-digit LCD 22 for a period of at least 20 months.

Portable power pack 9B is configured in a preferred embodiment to supply a voltage of at least seven volts, as shown in FIG. 3C. In a preferred embodiment, portable power pack 9B comprises two pairs of lithium batteries 15A & 15B and 16A & 16B, connected in parallel. The batteries in each pair of batteries are connected in series. As shown in FIG. 3C, battery 15A is connected in series with battery 15B and battery 16A is connected in series with battery 16B.

In a preferred embodiment, portable power supply 9A comprises a diode 50 and resistor 51 assembly connected in series with each pair of batteries. This diode/resistor assembly acts as a current limiting device that greatly reduces the probability of explosion if the batteries are short circuited. The portable power pack 9B provides current and voltage characteristics that will not produce a spark capable of igniting an explosive mixture. These characteristics provide for an intrinsically safe portable power supply in the present invention. The battery may preferably be a Tadiran® lithium inorganic battery (Type TL-2300) or an Electrochem CSC lithium oxyhalide primary cell (Series CSC93, 3B35). When configured as shown in FIG. 3C, the batteries provide an average of about 7.23 volts and 28 ampere hours.

Figure 3A:
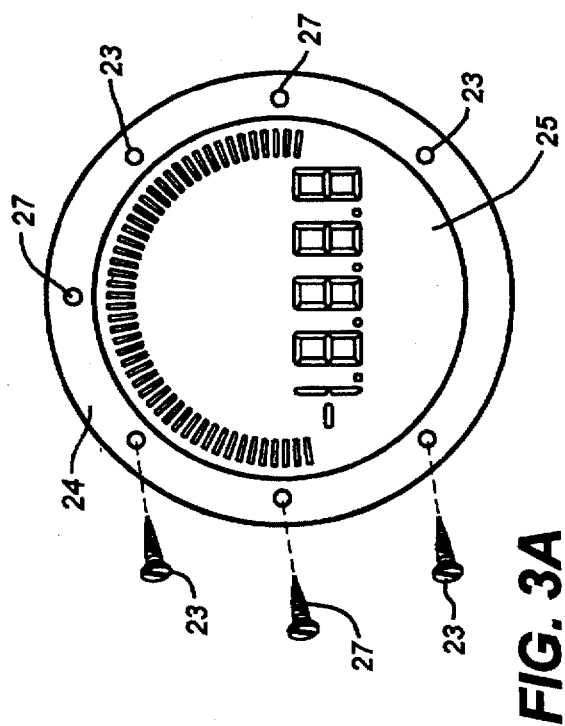
FIG. 3A is an exploded front view of the process variable display device.
Figure 3B:
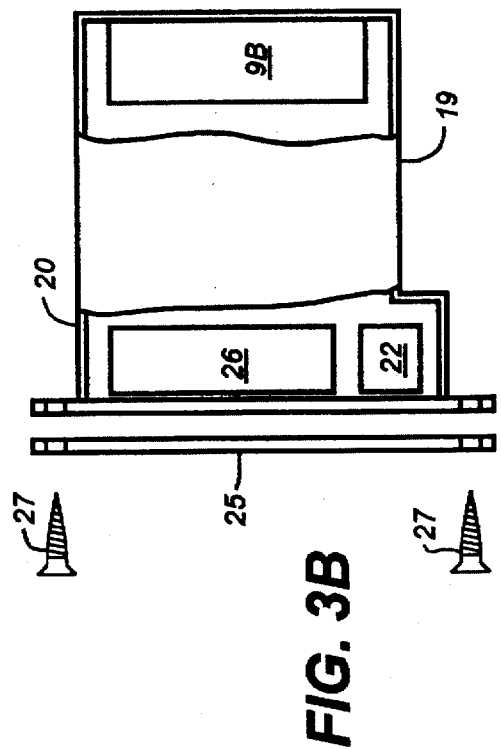
FIG. 3B is an exploded side view of the process variable display device in its housing.

In a preferred embodiment, the bar graph display 26, multi-digit LCD 22, and portable power pack 9B are contained within a housing 20 as depicted in FIGS. 3A and 3B. Portable housing 20 comprises a substantially cylindrical body 19 and a removable face 25 through which bar graph display 26 and multi-digit LCD 22 can be read. Removable face 25 is secured to cylindrical body 19 by a multiplicity of fasteners such that housing 20 forms an environmental barrier capable of preventing the in-leakage of dust or jetting water. In a preferred embodiment, housing 20 is capable of meeting an industry standard for the protection of electrical equipment known as "IP56."

In one preferred embodiment, three fasteners 27 are equidistantly spaced in the outer peripheral region 24 of removable face 25. In another preferred embodiment, four fasteners 23 are equidistantly spaced in the outer peripheral region 24 of removable face 25. The fastener configurations depicted by fasteners 23 and 27 in FIG. 3A are known in the art as "six inch gauge technology." An advantage of the present invention is that it is designed to retrofit existing six inch gauge technology. This retrofit capability adds to the ease of installation and economy of the present invention.

Figure 4B:
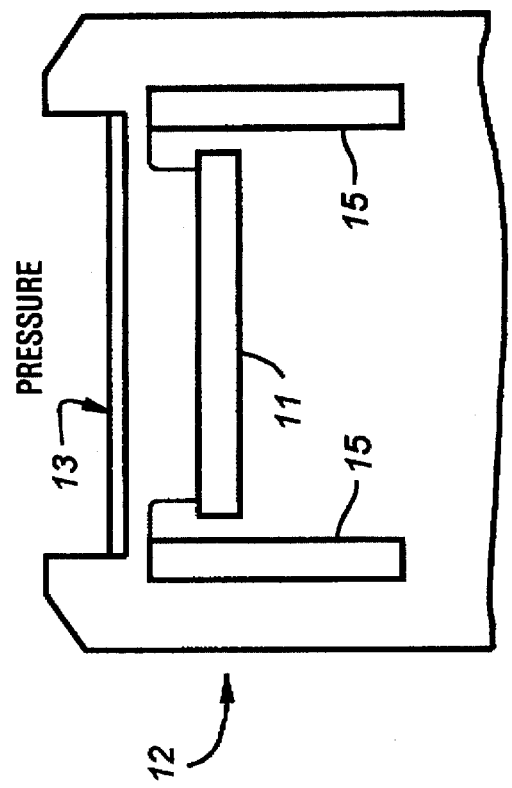
FIG. 4B is a side cutaway view of a preferred embodiment of the process variable measuring device.

In a preferred embodiment, the present invention comprises a process variable measuring device 10 capable of producing an electronic process variable input signal that is proportional to the magnitude of the measured process variable, as shown in FIGS. 2 and 4B. Process variable measuring device 10 provides an input signal to direct drive ADC 14 and multiplexed ADC 18.

Figure 4A:
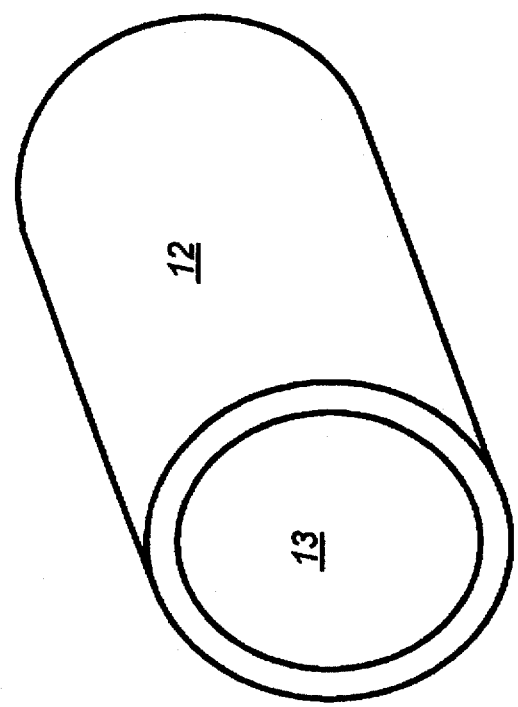
FIG. 4A is an isometric view of the process variable measuring device in its casing.

In a preferred embodiment, process variable measuring device 10 is a pressure sensor such as the piezoresistive pressure sensor manufactured by KELLER PSI of Hampton, Va., comprising a force collector 13 capable of being deflected in an amount proportional to a pressure applied against it and a strain gauge 11 mechanically coupled to force collector 13. Strain gauge 11 is configured to produce an electronic output signal proportional to the deflection of force collector 13, as shown in FIGS. 2, 4A, and 4B. In a preferred embodiment, strain gauge 11 is operable on a current draw of less than 1.0 milliampere and produces a differential voltage greater than or equal to 20 millivolts per volt of excitation.

As shown in FIG. 4A, the cylindrical components depicted are a part of the Wheatstone bridge shown in FIG. 2. Strain gauge 11 is capable of being powered by a constant 7 volts and excited by less than 1.0 milliampere of current and further capable of producing an output signal of 20 millivolts per volt of excitation under these input voltage and current conditions.

In a preferred embodiment, strain gauge 11 comprises a 3500 ohm Wheatstone bridge configured to produce a differential voltage electronic output signal as shown in FIG. 2. The electronic voltage output signal of at least 20 millivolts/ volt of excitation, of Wheatstone bridge 11 is a differential voltage signal. In a preferred embodiment, Wheatstone bridge 11 is operable on a current of less than 1.0 milliampere. The force collector 13 serves to protect the extremely delicate Wheatstone which is embedded in the silicon substrate of the integrated circuit. As the force collector detects a stress, it transmits this information (through a silicone coupler in the preferred embodiment) to the Wheatstone bridge. This transmitted force flexes the Wheatstone bridge, creating an imbalance. This imbalance is seen as a ratiometric shift in the two voltage outputs from the Wheatstone bridge.

Figure 5:
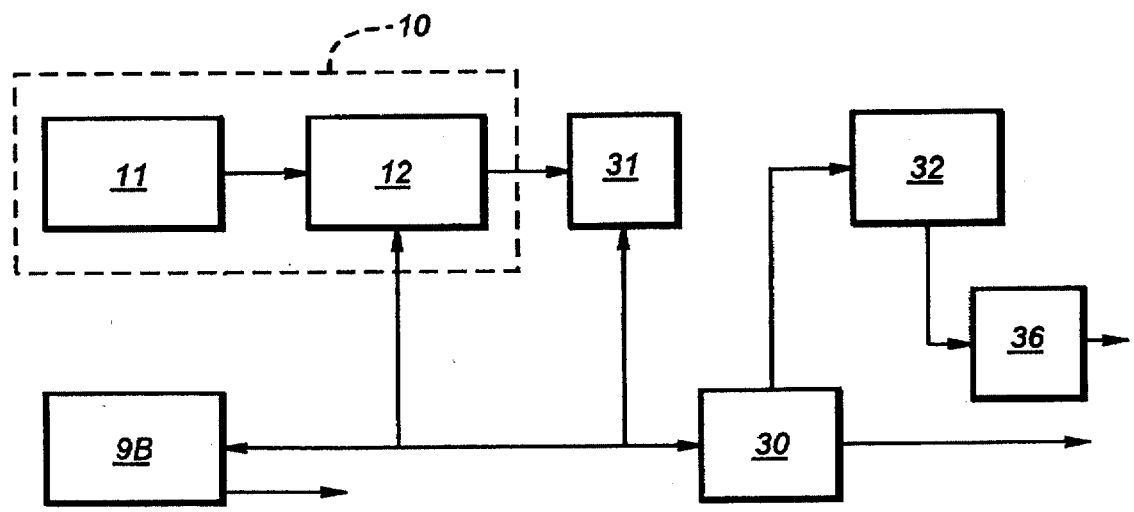
FIGS. 5 and 6 depict a block diagram of a fully digital embodiment of the sensor and display units, respectfully, of the present invention.
Figure 6:
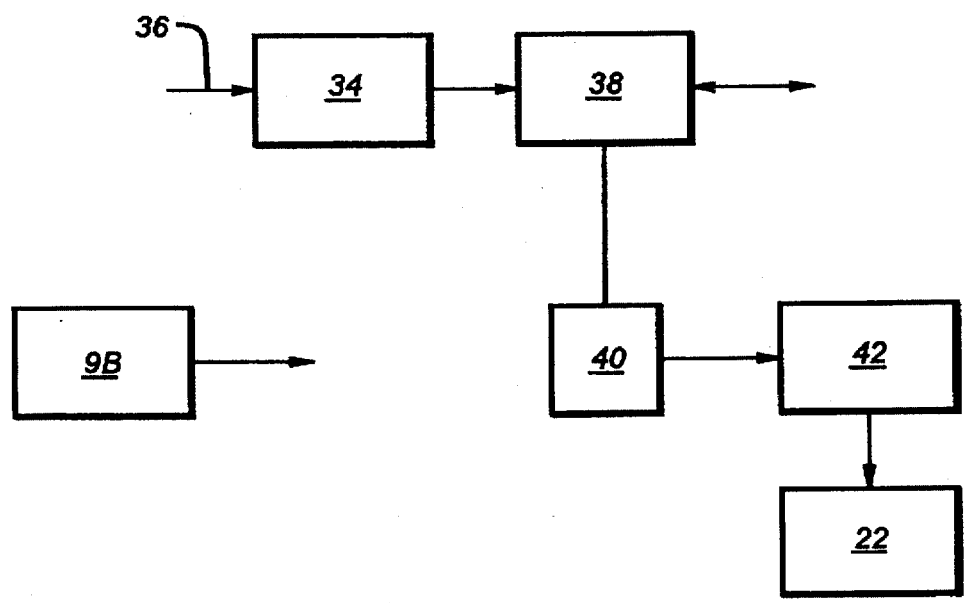

FIGS. 5 and 6 together depict an overall block diagram of an embodiment of the present invention that includes fully digital operation with microprocessor control. The circuit includes the process variable measuring device 10 including the bridge circuit 11 and the comparator 12. A power supply 9B provides power to the various components. The circuit also includes an ADC ("A/D") 31 which is preferably located in vicinity of the sensor.

The ADC 31 provides a digital signal to a microprocessor 30 that processes the digital signal in a manner previously described. In this way, the communication link between the sensor and the display portions of the invention is digital and therefore much more immune to noise and other effects. The microprocessor 30 provides the processed digital signal to a differential driver 32 that drives a differential receiver 34 over a sensor link 36. The microprocessor serves the additional functions of compensating for manufacturing variations from one sensor to another and accommodating temperature variations. The driver 32 and receiver 34 provide sufficient power to drive the components of FIG. 6 and buffer the various voltage levels. The differential receiver 34 provides the digital signal to a microprocessor 38 which processes the signal for reception by a digital to analog ("D/A") converter 40. The microprocessor 38 also provides the timing control for communication with the microprocessor 30 and provides the capability with communicating directly with external devices such as personal computers over an external digital link 41. The D/A converter 40 provides an analog signal to a set of LCD drivers 42 that drive the LCD display 44. Preferably the LCD display 44 includes the displays 22 and 26 on a single laminate, while each of the displays 22 and 26 has its own display circuitry.

Many modifications and variations may be made in the embodiments described herein and depicted in the accompanying drawings without departing from the concept of the present invention. Accordingly, it is clearly understood that the embodiments described and illustrated herein are illustrative only and are not intended as a limitation upon the scope of the present invention.

We claim:

1. A battery powered process variable display device capable of reading a process variable input signal from a process variable measuring device, comprising:
   a. a first ADC with digit drive capabilities configured to receive a process variable input signal from a process variable measuring device;
   b. a second ADC with bar graph driving capabilities configured to receive a process variable input signal from a process variable measuring device;
   c. a multi-digit LCD electronically coupled to receive an input signal from said first ADC;
   d. a multi-segment bar graph electronically coupled to receive an input signal from said second ADC; and
   e. a portable power supply operatively coupled to supply power to said first ADC, said second ADC, said multidigit LCD, and said multi-segment bar graph, said portable power supply comprising at least two battery assemblies arranged in parallel and further comprising a current limiting device connected in series with each of said battery assemblies, said current limiting devices capable of reducing the probability of explosion if said battery assemblies are short circuited.

2. The process variable display device of claim 1, wherein said first ADC is a direct drive ADC.

3. The process variable display device of claim 1, wherein said second ADC is a multiplexed ADC.

4. The process variable display device of claim 1, wherein said multi-segment bar graph has at least 62 segments.

5. The process variable display device of claim 1, wherein said multi-digit LCD comprises at least three digits, each of said digits being at least ¾" high.

6. The process variable display device of claim 1, wherein each of said current limiting devices comprises a diode connected in series with a resistor.

7. The process variable display device of claim 6, wherein said portable power supply provides at least 7 volts and 28 ampere hours of current for at least 20 months.

8. The process variable display device of claim 6, wherein said portable power supply is sealed in a casing capable of protecting said portable power supply from adverse environmental conditions.

9. The process variable display device of claim 6, wherein said battery assemblies comprise lithium batteries.

10. The process variable display device of claim 6, wherein each of said battery assemblies comprises at least two lithium batteries connected in series.

11. A portable power supply capable of powering a process variable display device, comprising:
    a. a casing capable of protecting said portable power supply from adverse environmental conditions;
    b. two battery assemblies connected in parallel inside said casing; and
    c. two current limiting devices inside said casing, each of said current limiting devices connected in series with one of said battery assemblies, said current limiting devices being capable of reducing the probability of explosion if said battery assemblies are short circuited.

12. The apparatus of claim 11, wherein each battery assembly comprises at least two lithium batteries connected in series.

13. The apparatus of claim 11, wherein each current limiting device comprises a diode connected in series with a resistor.

14. The apparatus of claim 11, further comprising a process variable display device operatively coupled to receive power from said portable power supply.

15. The apparatus of claim 14, wherein the voltages of said batteries are sufficient for said portable power supply to supply power to said process variable display device for at least 20 months.

16. An intrinsically safe portable power supply comprising:
   a. a casing capable of protecting said portable power supply from adverse environmental conditions;
   b. two lithium battery assemblies connected in parallel inside said casing; and
   c. two current limiting devices housed in said casing, each of said current limiting devices connected in series with one of said battery assemblies, each of said current limiting devices comprising a diode and being capable of reducing the probability of explosion if said battery assemblies are short circuited.

17. The apparatus of claim 16, wherein each battery assembly comprises at least two lithium batteries connected in series.

18. The apparatus of claim 16, wherein each current limiting device further comprises a resistor connected in series with said diode.

19. The apparatus of claim 16, wherein said battery assemblies and current limiting devices are sealed in said housing.

20. The apparatus of claim 18, further comprising an electronic display device operatively coupled to be powered by said battery assemblies.

* * * * *

US005673038C1

(12) EX PARTE REEXAMINATION CERTIFICATE (4871st)
United States Patent
McLatchy et al.

(10) Number: US 5,673,038 C1
(45) Certificate Issued: Oct. 28, 2003

(54) PROCESS VARIABLE MEASURING AND DISPLAY DEVICE AND PORTABLE POWER SUPPLY

(75) Inventors: Richard Colgate McLatchy, Houston, TX (US); Jon Douglas de Silva, Houston, TX (US)

(73) Assignee: Houston Digital Instruments, Houston, TX (US)

Reexamination Request:
No. 90/005,583, Dec. 7, 1999
No. 90/005,808, Sep. 1, 2000

Reexamination Certificate for:
Patent No.: 5,673,038
Issued: Sep. 30, 1997
Appl. No.: 08/089,669
Filed: Jul. 9, 1993

Related U.S. Application Data

(63) Continuation-in-part of application No. 07/765,432, filed on Sep. 25, 1991, now abandoned.

(51) Int. Cl.⁷ .............................................. G08C 19/16
(52) U.S. Cl. .......................... 340/870.21; 340/870.39; 345/211; 345/35
(58) Field of Search ................................ 429/157, 149, 429/150, 1; 175/104; 29/623.1; 320/164; 361/56, 57, 54; 340/521

(56) References Cited

U.S. PATENT DOCUMENTS 3,686,530 A   8/1972   Bognt
3,783,877 A   1/1974   Bowers ........................ 607/34

(List continued on next page.)

FOREIGN PATENT DOCUMENTS

GB   2139830       11/1984
WO   WO87/04783     8/1987
WO   WO90/10334     9/1990

OTHER PUBLICATIONS

Technical report entitled "Tadiran TM Lithium Inorganic Batteries", Nov. 1981.
Brochure entitled "Battery–Operated Pump Stroke Counter" 1984.
Report entitled, "Micropower Under–/Over–Voltage Detector", 1982.
Brochure entitled "Solarex Solar Microgenerators TM For Watches and Calculators" 1976.
Eagle Research Corporation Product Brief RTU 80/1 EFC & RTU 80/2 EFC.
Eagle Research Corporation Product Brief RTU 80/1 EPR.
Houston Digital Instruments, Inc. Operations and Maintenance Manual for Model #HDI 2000 Pressure Gauge.
Houston Digital Instruments, Inc. Installations, Operations and Maintenance Manual SWACO Dual 1502 Sensor w/Gauge and Switchbox Part #HDI2006–S051–SWA–AA; Jul. 12, 1992.
Houston Digital Instruments, Inc. Installations, Operations and Maintenance Manual Superior Oilfield Products, Inc. Dual Electronic Pressure Gauge and Dual Electronic Choke Position Console Components with explosion Proof Battery Packs HDI #HDI9102–S036–SWA–AA; Jul. 15, 1992.
Houston Digital Instruments, Inc. HDI 2202 Choke Position Installation, Operation and Maintenance Manual for Superior Oilfield Products, Inc.; Jul. 10, 1992.

(List continued on next page.)

Primary Examiner—K. Wieder

(57) ABSTRACT

This invention relates to the field of process variable measuring and display devices and portable power supplies for process variable display devices. This invention can be used to measure and display any process variable, including pressure, temperature, volume, and flow rate. Specifically, this invention relates to an electronic process variable measuring device electronically coupled to a battery powered process variable display device which displays both a bar graph trend indication of the process variable and a digital display of the process variable. In a preferred embodiment, the process variable display device is totally self-contained, including the battery operated power supply.

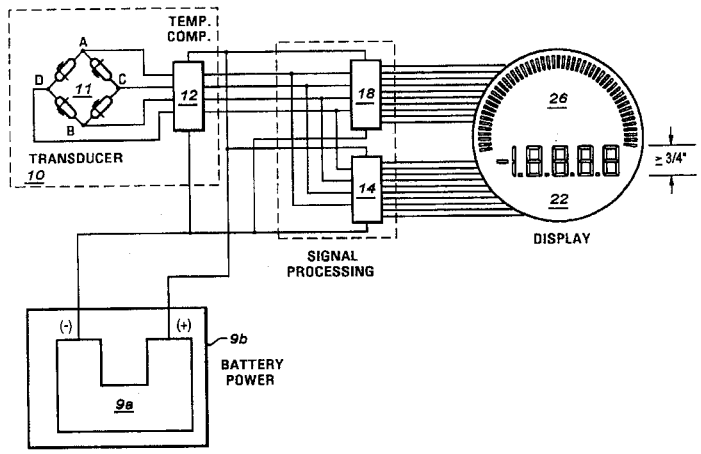

U.S. PATENT DOCUMENTS

| | | | |
|---|---|---|---|
| 3,835,465 A | * 9/1974 | Tannas et al. | 345/40 |
| 3,844,841 A | 10/1974 | Baker | 429/90 |
| 3,885,991 A | 5/1975 | Finkel | 429/1 |
| 3,939,011 A | 2/1976 | Zaleski | 429/54 |
| 3,955,132 A | 5/1976 | Greenwood | 323/231 |
| 3,972,739 A | 8/1976 | Hammel | 429/90 |
| 3,995,132 A | 11/1976 | Piber | |
| 4,001,640 A | 1/1977 | Biber | |
| 4,056,764 A | 11/1977 | Endo | 320/101 |
| 4,091,186 A | 5/1978 | Ott | 429/157 |
| 4,099,216 A | 7/1978 | Weberg | 361/56 |
| 4,231,025 A | 10/1980 | Turner | 340/521 |
| 4,255,698 A | 3/1981 | Simon | 320/134 |
| 4,265,984 A | 5/1981 | Kaye | 429/178 |
| 4,281,278 A | 7/1981 | Bilsky | 320/136 |
| 4,287,273 A | 9/1981 | Harney | 429/153 |
| 4,328,456 A | 5/1982 | Suzuki | 320/101 |
| 4,437,466 A | 3/1984 | Saulson | 607/34 |
| 4,539,272 A | 9/1985 | Goebel | 429/94 |
| 4,604,706 A | 8/1986 | Fisher | 702/15 |
| 4,622,274 A | 11/1986 | Lowrance | 429/1 |
| 4,638,396 A | 1/1987 | Mukli et al. | |
| 4,662,736 A | 5/1987 | Taniguchi | 396/278 |
| 4,663,628 A | 5/1987 | Duncan | 340/853.9 |
| 4,665,398 A | 5/1987 | Lynch | 340/853.9 |
| 4,675,259 A | 6/1987 | Totty | |
| 4,689,544 A | 8/1987 | Stadnick | 320/147 |
| 4,709,234 A | 11/1987 | Forehand | 340/853.3 |
| 4,728,807 A | 3/1988 | Harafuji | 307/52 |
| 4,745,543 A | * 5/1988 | Michener et al. | 345/40 |
| 4,770,954 A | 9/1988 | Noordenbos | 429/9 |
| 4,789,824 A | * 12/1988 | Henkelmann | 324/114 |
| 4,795,972 A | * 1/1989 | Roppelt et al. | 324/114 |
| 4,823,068 A | 4/1989 | Delmerico | 318/807 |
| 4,845,419 A | 7/1989 | Hacker | 320/136 |
| 4,866,607 A | 9/1989 | Anderson | 702/11 |
| 4,875,031 A | 10/1989 | Filippi | 340/605 |
| 4,879,188 A | 11/1989 | Meinhold | 429/7 |
| 4,882,678 A | 11/1989 | Hollis et al. | |
| 4,941,456 A | 7/1990 | Wood | 600/152 |
| 4,957,829 A | 9/1990 | Holl | 429/99 |
| 4,970,073 A | 11/1990 | Arzur | 429/152 |
| 4,973,936 A | 11/1990 | Dimpault-Darcy | 338/32 R |
| 4,999,753 A | 3/1991 | MacKenzie | 362/234 |
| 5,002,840 A | * 3/1991 | Klebenow et al. | 429/9 |
| 5,030,524 A | 7/1991 | Stadnick | 429/66 |
| 5,034,720 A | 7/1991 | Bell | 338/219 |
| 5,049,864 A | * 9/1991 | Barshinger | 345/35 |
| 5,050,612 A | 9/1991 | Matsumura | |
| 5,079,509 A | * 1/1992 | Marsh | 324/114 |
| 5,081,483 A | 1/1992 | Ishimura et al. | |
| 5,099,188 A | 3/1992 | Birnbreier | 320/127 |
| 5,104,752 A | 4/1992 | Baughman | 429/1 |
| 5,119,019 A | * 6/1992 | George | 324/115 |
| 5,121,046 A | 6/1992 | McCullough | 320/117 |
| 5,160,925 A | 11/1992 | Dailey | 340/853.3 |
| 5,191,891 A | 3/1993 | Righter | |
| 5,335,133 A | 8/1994 | Bishop et al. | |
| 5,412,312 A | * 5/1995 | Crass et al. | 324/115 |

OTHER PUBLICATIONS

Houston Digital Instruments, Inc. Installations, Operations and Maintenance Manual Single Pneumatic Choke Console HDI Part #HDI9001–S104–QOP–AA; Jun. 25, 1992.

Houston Digital Instruments, Inc. Quality Oilfield Products Dual Pneumatic Choke Console Model #HDI9105–S106–QOP–AA; Jun. 25, 1992.

Houston Digital Instruments, Inc. Installations, Operations and Maintenance Manual Dual Choke Panel HDI Part #HDI9101–S033–SHF–AA; Mar. 5, 1992.

Houston Digital Instruments, Inc. Choke Instrumentation: Installations, Operations and Maintenance Manual for Santa Fe Compact Driller Model #HDI 9201–S050–SFE–AA Dual Electronic Choke Console; Mar. 5, 1992.

Houston Digital Instruments, Inc. Operations and Maintenance Manual for Dolphin Titan Pressure Gauge and Intrinsically Safe Junction Box with Batteries and Barriers Model #HDI2002–S031–DLP–AA.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–20 are cancelled.

* * * * *